(12) United States Patent
Osamura et al.

(10) Patent No.: US 9,919,605 B2
(45) Date of Patent: Mar. 20, 2018

(54) DRIVING FORCE CONTROLLER FOR ELECTRIC VEHICLE

(71) Applicant: CALSONIC KANSEI CORPORATION, Saitama-shi, Saitama (JP)

(72) Inventors: Kensuke Osamura, Saitama (JP); Mitsuo Hirata, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/300,452

(22) PCT Filed: Mar. 27, 2015

(86) PCT No.: PCT/JP2015/059696
§ 371 (c)(1),
(2) Date: Sep. 29, 2016

(87) PCT Pub. No.: WO2015/152068
PCT Pub. Date: Oct. 8, 2015

(65) Prior Publication Data
US 2017/0120752 A1    May 4, 2017

(30) Foreign Application Priority Data

Apr. 2, 2014   (JP) ................................. 2014-075961

(51) Int. Cl.
*B60L 15/20*   (2006.01)
*B60L 3/00*   (2006.01)
*B60R 16/023*   (2006.01)

(52) U.S. Cl.
CPC ............. *B60L 3/0061* (2013.01); *B60L 15/20* (2013.01); *B60R 16/0231* (2013.01);
(Continued)

(58) Field of Classification Search
None
See application file for complete search history.

(56) References Cited

U.S. PATENT DOCUMENTS 6,806,667 B1 * 10/2004 Sasaki ................... B60K 6/365
180/170
9,174,549 B2 * 11/2015 Ichinose ................. B60L 3/06
(Continued)

FOREIGN PATENT DOCUMENTS

| JP | 2012-080655 A | 4/2012 |
|---|---|---|
| JP | 2012-231577 A | 11/2012 |
| JP | 2013-223374 A | 10/2013 |

*Primary Examiner* — Navid Ziaeianmehdizadeh
(74) *Attorney, Agent, or Firm* — Foley & Lardner LLP

(57) ABSTRACT

A driving force controller for an electric vehicle includes a feed-forward compensator for computing a second target driving force so as to suppress overshooting of an actual driving force that is actually outputted, with respect to a first target driving force requested by a driver, the feed-forward compensator includes a first transfer function expressing a characteristic that the actual driving force becomes a predetermined response with respect to the first target driving force; and an inverse of a second transfer function approximately expressing a transmission characteristic between a input target driving force and the actual driving force in a control system except the feed-forward compensator.

6 Claims, 10 Drawing Sheets

(52) U.S. Cl.
CPC ..... *B60L 2240/421* (2013.01); *B60L 2250/26* (2013.01); *B60L 2260/42* (2013.01)

(56) References Cited

U.S. PATENT DOCUMENTS

| | | | | |
|---|---|---|---|---|
| 9,315,114 B2* | 4/2016 | Oono | ................. | B60L 15/06 |
| 2002/0060545 A1* | 5/2002 | Inagaki | ............... | B60L 11/1807 |
| | | | | 318/629 |
| 2003/0060961 A1* | 3/2003 | Ishizu | .................. | B60W 10/06 |
| | | | | 701/93 |
| 2005/0049761 A1* | 3/2005 | Kataoka | .............. | B60G 17/016 |
| | | | | 701/1 |
| 2005/0065690 A1* | 3/2005 | Ashizawa | ................ | B60K 6/48 |
| | | | | 701/51 |
| 2006/0017414 A1* | 1/2006 | Joe | ........................ | B60K 6/445 |
| | | | | 318/432 |
| 2007/0203632 A1* | 8/2007 | Saitou | .................. | B60W 30/20 |
| | | | | 701/51 |
| 2009/0048751 A1* | 2/2009 | Nakai | .................... | B60W 10/06 |
| | | | | 701/70 |
| 2012/0081051 A1 | 4/2012 | Kobayashi et al. | | |
| 2012/0239237 A1* | 9/2012 | Hashimoto | ............ | B60K 6/365 |
| | | | | 701/22 |
| 2013/0184918 A1* | 7/2013 | Motosugi | ................ | B60L 15/20 |
| | | | | 701/22 |
| 2013/0325285 A1* | 12/2013 | Bang | ...................... | B60L 15/20 |
| | | | | 701/99 |
| 2015/0012160 A1* | 1/2015 | Tsutsumi | ................ | B60L 15/20 |
| | | | | 701/22 |
| 2015/0112532 A1* | 4/2015 | Oono | ........................ | B60L 7/14 |
| | | | | 701/22 |
| 2015/0127202 A1* | 5/2015 | Itou | ......................... | B60L 15/20 |
| | | | | 701/22 |
| 2017/0043677 A1* | 2/2017 | Ko | .......................... | B60L 15/20 |

* cited by examiner

FIG. 4
(a)
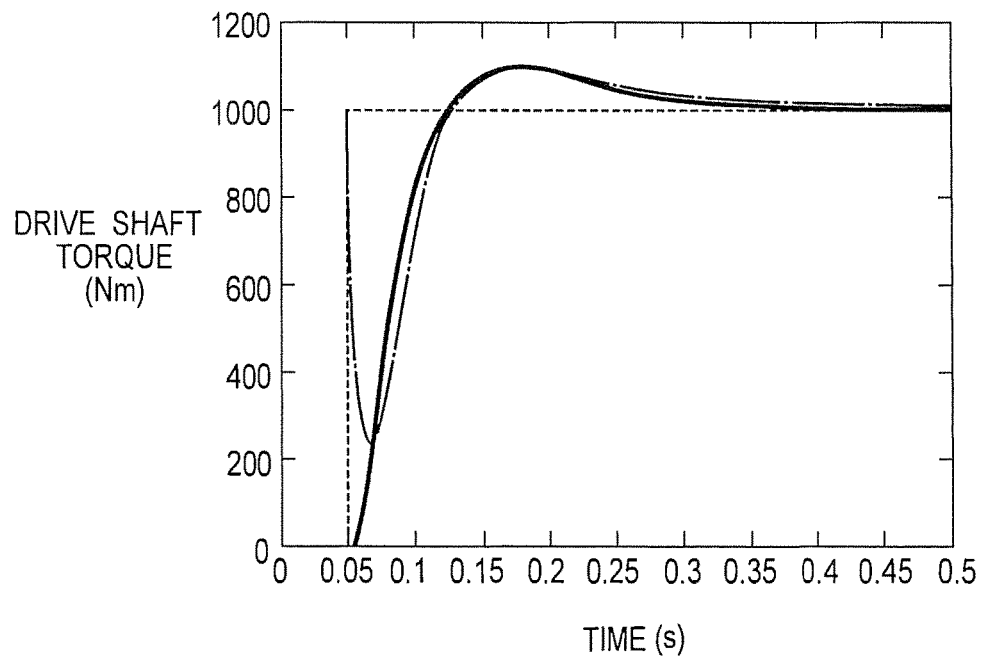
(b)
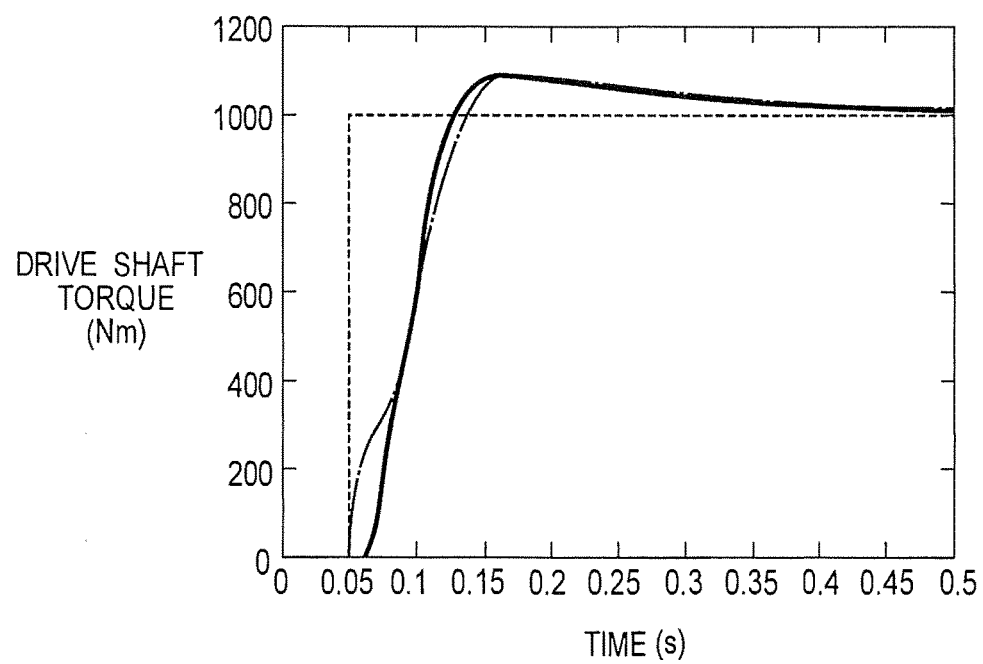

FIG. 7
(a)
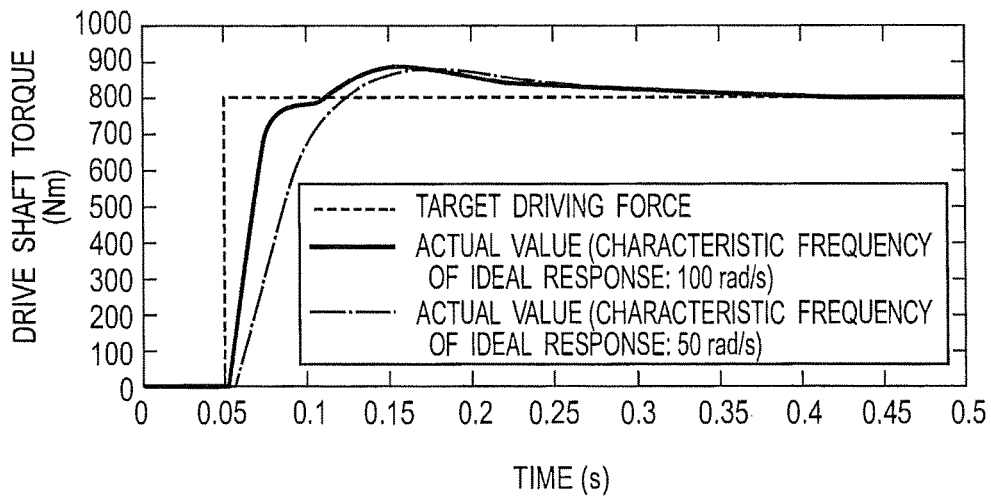
(b)
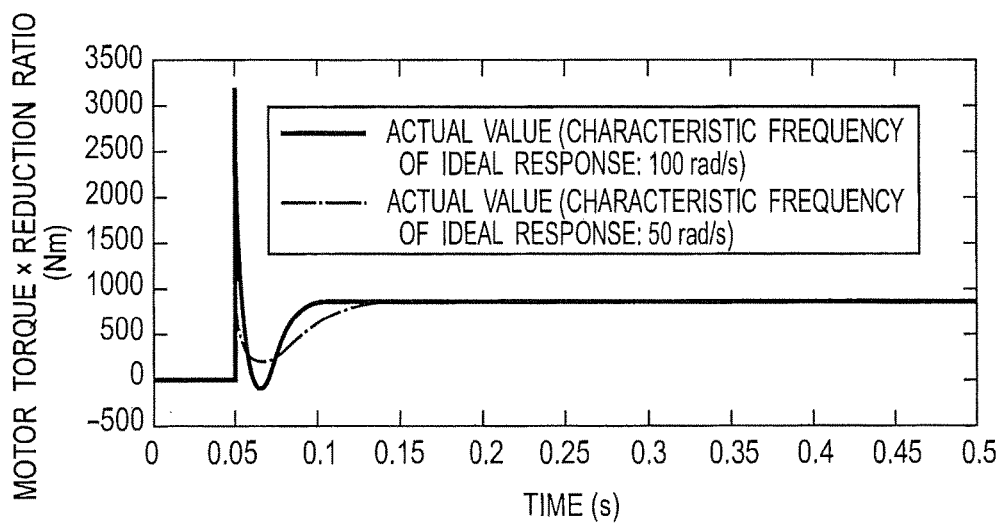

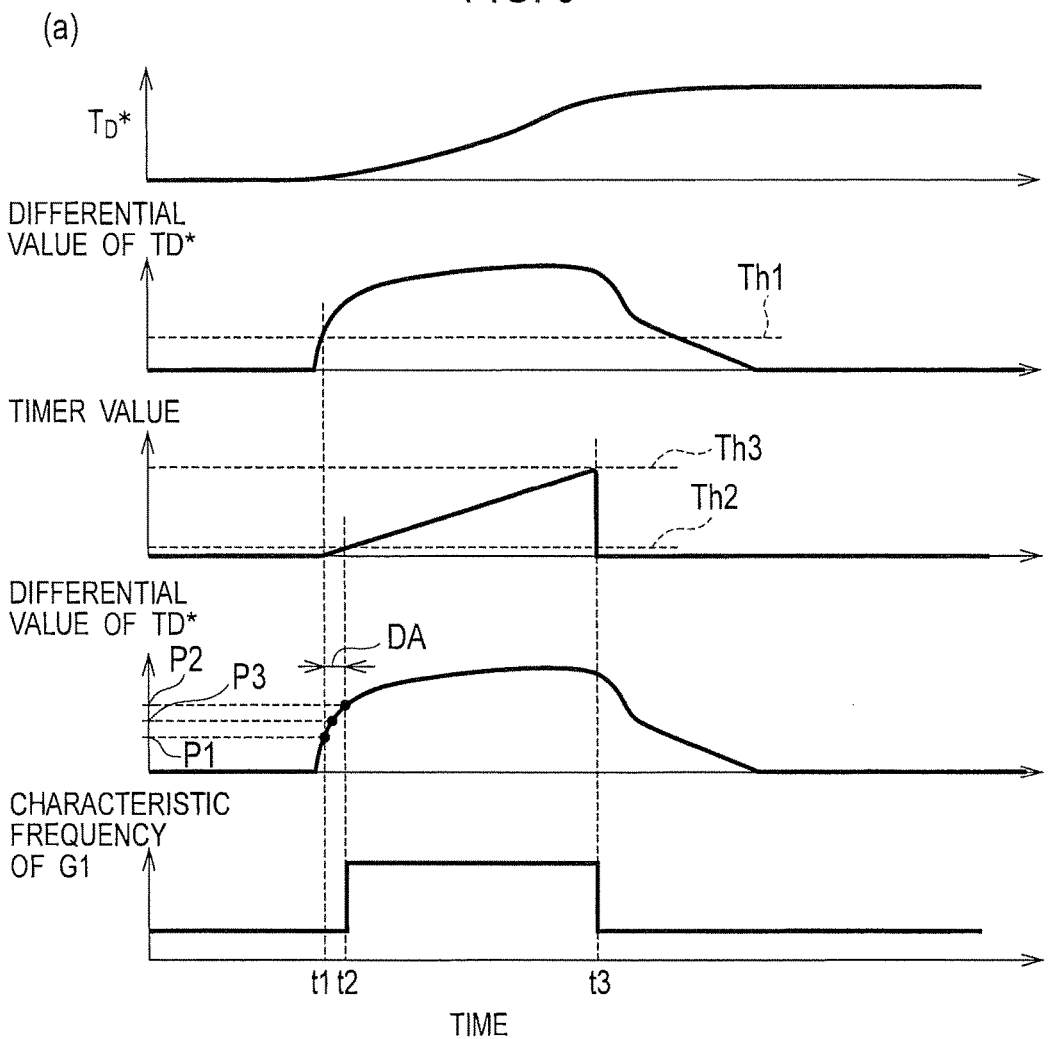
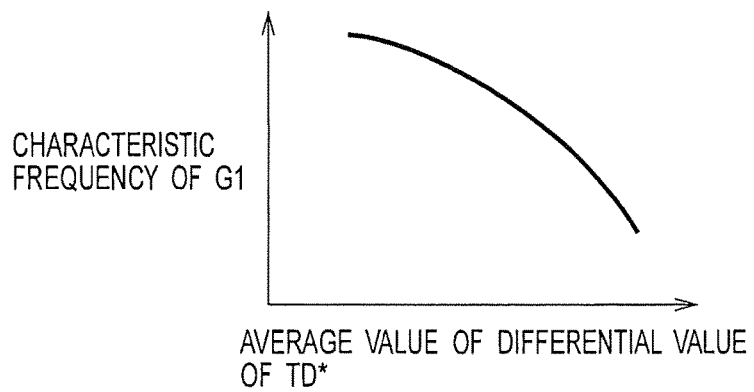
FIG. 9

FIG. 10
(a)
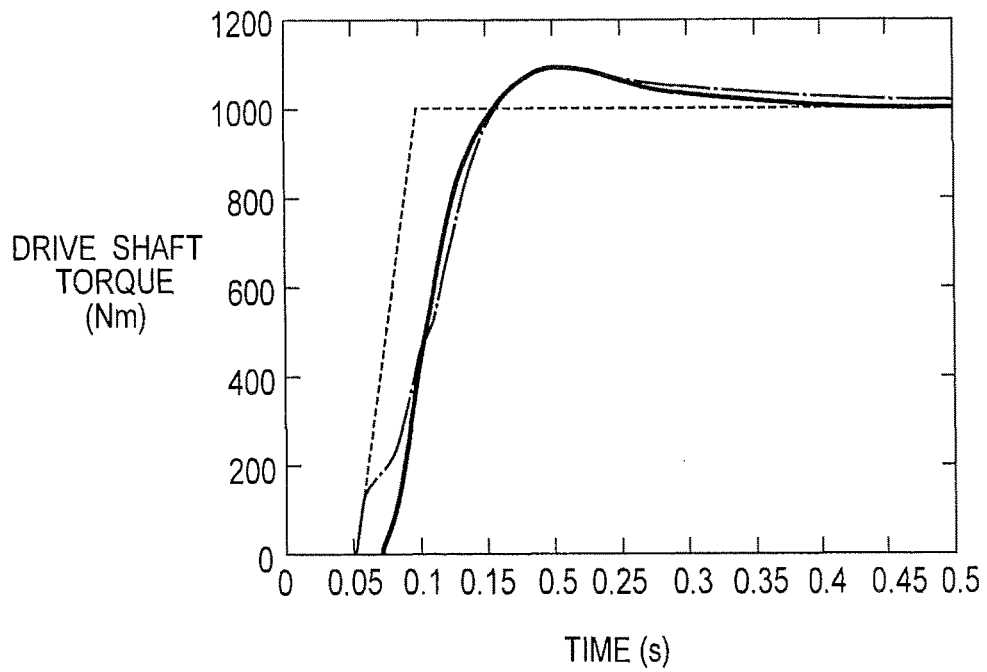
(b)
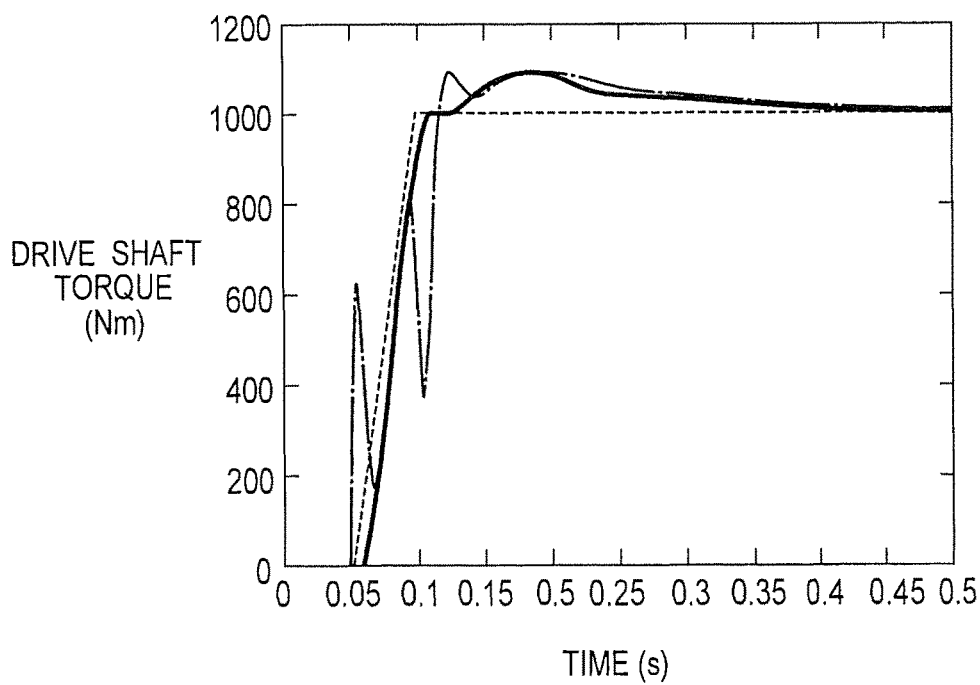

DRIVING FORCE CONTROLLER FOR ELECTRIC VEHICLE

TECHNICAL FIELD

The present invention relates to a driving force controller for an electric vehicle.

BACKGROUND ART

In a driving force controller for an electric vehicle, a motor torque command value set based on a required driving force of a driver (target driving force) is corrected to suppress a vibration (a torsional vibration) generated from a torsion of a drive system (in the present application, a term "driving force" shall be used as synonymous with a "drive shaft torque"). For example, the driving force controller calculates, as a target vehicle speed, a vehicle speed in a case where a motor torque command value is applied to a vehicle model by use of an ideal vehicle model assuming that a drive system is a rigid body that does not generate torsion. Then, the driving force controller obtains deviation between the target vehicle speed and the actual vehicle speed, and calculates a correction value to reduce the deviation. The driving force controller thus obtains a final motor torque command value by adding the correction value to the motor torque command value.

In the ideal vehicle model, a disturbance torque such as: a running resistance torque such as air resistance; and a braking torque caused by braking, is not inputted. Thus, such a disturbance torque is not reflected on the target vehicle speed outputted from the vehicle model and the correction value computed based on the target vehicle speed. As a result, although the torsional vibration can be suppressed by the correction value, there has been a problem that an actual driving force is deviated from the required driving force of the driver because, when running resistance is generated or at the time of braking, such an excessive driving force is generated so as to cancel out the running resistance torque or the braking torque caused by braking.

In Patent Literature 1, as a method for suppressing such increase of the driving force resulting from the disturbance torque, an external input estimator has been proposed for estimating the disturbance torque, subtracting the disturbance torque from a motor request torque in advance when computing the target vehicle speed and the target motor speed, and computing the target rotational speed with the disturbance torque taken into consideration.

CITATION LIST

Patent Literature

Patent Literature 1: Japanese Patent Laid-Open Publication No. 2012-80655

SUMMARY OF INVENTION

Technical Problem

However, in Patent Literature 1, the computation for estimating the disturbance torque by an input torque estimator is complicated. In addition, since the input torque estimator is an inverse system of a plant, it is difficult to accurately obtain a parameter of a transfer function of the plant that is used for estimating an input torque.

Moreover, since the deviation between the target vehicle speed and the actual vehicle speed does not completely become zero, the actual driving force overshoots the target driving force.

An object of the present invention is to provide a driving force controller for an electric vehicle which can reduce overshooting of the actual driving force with respect to the target driving force with a simple configuration, while suppressing the torsional vibration generated in the drive system.

Solution to Problem

The present invention is a driving force controller for an electric vehicle, which controls driving force of a motor in a vehicle drive system, the driving force controller including: a target driving force setting unit for setting a target driving force based on a required driving force of a driver; a feed-forward compensator having a first transfer function for causing an actual driving force with respect to the target driving force to become an ideal response that does not overshoot, and an inverse system of a control system for approximating a response of a control system that performs dynamic correction on the target driving force by a second transfer function and taking an inverse of the second transfer function; a target speed computing unit for inputting a target driving force corrected by the feed-forward compensator to an ideal vehicle model in which the vehicle drive system is assumed to have no backlash and to have a perfect rigid body and computing a target rotational speed of the motor of the ideal vehicle model; a correction amount computing unit for computing, based on the target rotational speed and an actual rotational speed of the motor, a correction amount for reducing deviation between the target rotational speed and the actual rotational speed; and a command value computing unit for computing a motor torque command value by adding the correction amount to the target driving force.

BRIEF DESCRIPTION OF DRAWINGS

FIG. 4($a$) is a graph showing a simulation result of a target driving force, an actual driving force, and a motor torque when a first transfer function G1 and a second transfer function G2 of a secondary delay element are used in the first embodiment of the present invention. FIG. 4($b$) is a graph showing a simulation result of the target driving force, the actual driving force, and the motor torque when a low-pass filter is used as a comparative example.

FIG. 5($b$) is a graph showing detailed changes at rising of the target driving force and the actual driving force shown in FIG. 5($a$).

FIG. 6($b$) is a graph showing detailed changes at rising of the target driving force and the actual driving force shown in FIG. 6($a$).

FIG. 7(a) is a graph showing a change of a drive shaft torque when a characteristic frequency of an ideal response of the first embodiment is changed from 50 rad/s to 100 rad/s. FIG. 7(b) is a graph showing a change of a motor torque×a speed reduction ratio when the characteristic frequency of the ideal response of the first embodiment is changed from 50 rad/s to 100 rad/s.

FIG. 9(a) is a timing chart of each portion for explaining an operation of a characteristic frequency setting unit of the driving force controller for an electric vehicle according to the second embodiment of the present invention. FIG. 9(b) is a diagram showing a conversion table for acquiring a characteristic frequency of the first transfer function G1 from an average value of a differential value of a driving force request value.

FIG. 10(a) is a graph showing a change of the drive shaft torque when a characteristic frequency of each of the first transfer function G1 and the second transfer function G2 of the first embodiment is set to 50 rad/s. FIG. 10(b) is a graph showing a change of the drive shaft torque when a characteristic frequency of each of the first transfer function G1 and the second transfer function G2 of the second embodiment is set to 200 rad/s.

DESCRIPTION OF EMBODIMENTS

A driving force controller for an electric vehicle of embodiments solved the problem of the driving force controller for an electric vehicle (Japanese Patent Application No. 2013-249081, filed on Dec. 2, 2013), which is filed by the applicant and is not known at the time of filing of the present application.

Figure 1:
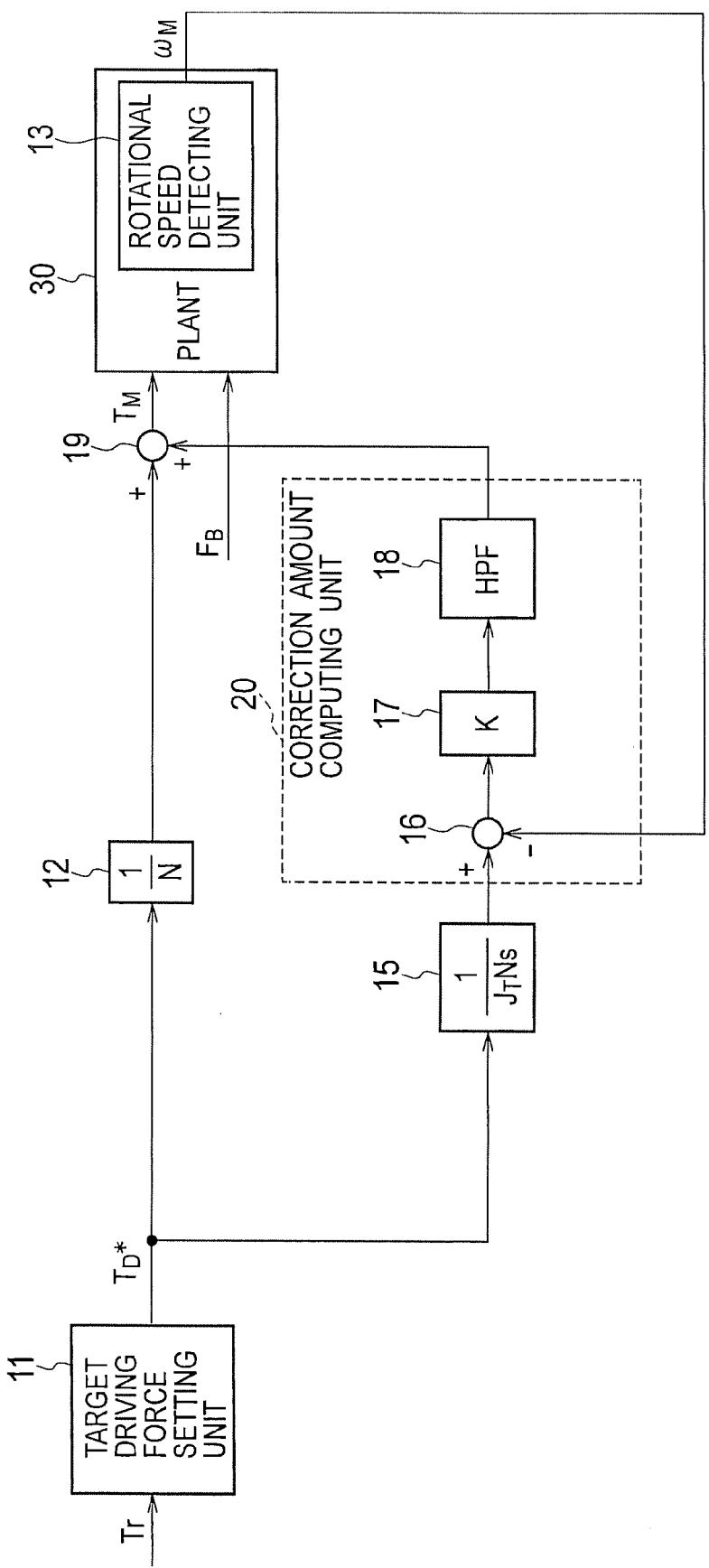
FIG. 1 is a block diagram showing an example of a configuration of a driving force controller for an electric vehicle.

First, the driving force controller for an electric vehicle already filed by the applicant will be described by referring to FIG. 1. The driving force controller for an electric vehicle can be mounted on an electric vehicle such as an electric-powered vehicle (EV), and includes a target driving force setting unit 11, a dividing unit 12, a target speed computing unit 15, a correction amount computing unit 20, and a command value computing unit 19. To the command value computing unit 19, a plant 30 that is a controlled object is connected.

The plant 30 is a drive system of the electric vehicle and includes a motor (not shown), and wheels (not shown) coupled to the motor via an output shaft and a drive shaft. Rotations of the motor are controlled by a motor torque command value $T_M$, which is computed by the command value computing unit 19. When the motor is rotated in the drive system of the electric vehicle, a vibration (a torsional vibration) is generated from torsion of the drive shafts. To suppress the torsional vibration, correction is made when the command value computing unit 19 computes a motor torque command value.

The target driving force setting unit 11 sets a target driving force $T_D$*[Nm] on the basis of the required driving force Tr corresponding to accelerator pedal operation of a driver. The dividing unit 12 divides the target driving force $T_D$*, which is set by the target driving force setting unit 11, by a speed reduction ratio N of a reduction gear (not shown). The target driving force after the division is a motor torque command value (a first motor torque command value) before the correction and is inputted to the command value computing unit 19.

The target speed computing unit 15 integrates the target driving force $T_D$*, which is set by the target driving force setting unit 11, and computes a rotational speed of the motor of an ideal vehicle model as a target rotational speed. The ideal vehicle model is a model assuming that the vehicle drive system has no backlash and has a perfect rigid body. A transfer characteristic (transfer function) Gm(s) of the ideal vehicle model can be expressed, for example, by the following equation 1:

$$Gm(s) = \frac{1}{J_T N s} \quad \text{[Equation 1]}$$

where $J_T$[Nms$^2$] is motor-shaft converted total inertia (a moment of inertia), N (non-dimensional amount) is the speed reduction ratio, and s is a Laplace variable in the Laplace conversion.

The correction amount computing unit 20 computes a correction amount for the first motor torque command value based on the target rotational speed computed by the target speed computing unit 15 and the actual rotational speed $\omega_M$ [rad/s] (actual rotational speed) of the motor in the plant 30. The actual rotational speed $\omega_M$ can be detected by a rotational speed detecting unit 13 mounted on the output shaft of the motor in the plant 30, for example.

The correction amount computed by the correction amount computing unit 20 is for suppressing the torsional vibration generated in the drive system. The correction amount is computed so that the deviation between the target rotational speed and the actual rotational speed $\omega_M$ becomes zero or small, and that a disturbance torque component is removed. The disturbance torque component means a running resistance torque component such as air resistance, and a braking torque component caused by braking.

The correction amount computing unit 20 includes a deviation computing unit 16, a multiplying unit 17, and a disturbance removing unit 18. The deviation computing unit 16 computes the deviation between the target rotational speed and the actual rotational speed by subtracting the actual rotational speed $\omega_M$ detected by the rotational speed detecting unit 13 from the target rotational speed computed by the target speed computing unit 15.

The multiplying unit 17 computes the correction amount (first correction amount) for suppressing the torsional vibration generated in the drive system by multiplying the deviation computed by the deviation computing unit 16 by a proportional gain K (K=2, for example). The first correction amount is to reduce the deviation between the target rotational speed and the actual rotational speed $\omega_M$ to zero or small.

The disturbance removing unit 18 performs dynamic correction processing (filter processing) on the first correction amount computed by the multiplying unit 17 and removes the disturbance torque component. The disturbance removing unit 18 computes a final correction amount (second correction amount) by making a high-frequency side of the first correction amount pass through by a high-pass filter (HPF) and cutting off a low-frequency side so as to remove the disturbance torque component included in the first correction amount.

For the high-pass filter, transfer functions Gh1(s) and Gh2(s) as expressed in the following equations 2 and 3 can be used:

$$Gh1(s) = \frac{s}{s + \omega_{HPF}} \quad \text{[Equation 2]}$$

$$Gh2(s) = \frac{s^2}{(s + \omega_{HPF})^2} \quad \text{[Equation 3]}$$

In the equations 2 and 3, s is the Laplace variable in the Laplace conversion and $\omega_{HPF}$[rad/s] is a cut-off frequency. The larger the cut-off frequency $\omega_{HPF}$ is, the disturbance torque component in the wider frequency band can be removed, but the effect of suppressing the torsional vibration (vibration suppressing performance) is lowered to the contrary, which is a trade-off relation. Thus, they are preferably set to the values satisfying both the removal of the disturbance torque component and the vibration suppressing performance.

The cut-off frequency $\omega_{HPF}$ of the high-pass filter is set to 0.3 Hz, for example, so that the disturbance torque component with a frequency relatively smaller than the torsional vibration frequency can be cut off while allowing a frequency (in the vicinity of 10 Hz, for example) of the torsional vibration to pass through. For the torsional vibration component having passed through the high-pass filter, the correction amount for cancelling it is computed. Since the disturbance torque component is cut off by the high-pass filter, correction for canceling the disturbance torque component is not performed.

The command value computing unit 19 computes a final motor torque command value $T_M$ (a second motor torque command value) [Nm] of the motor that drives the vehicle by adding the correction amount from which the disturbance torque component has been removed by the disturbance removing unit 18 to the first motor torque command value computed by the dividing unit 12. The motor torque command value $T_M$ is inputted to the plant 30 and motor torque is generated to coincide with or to follow the motor torque command value $T_M$, and the motor is rotated. Moreover, a braking force $F_B$[N] caused by braking of the driver is also inputted to the plant 30.

As described above, by computing the target rotational speed by using the ideal vehicle model and by computing the correction amount so that the deviation between the target rotational speed and the actual rotational speed becomes zero or small, it is possible to suppress the torsional vibration generated in the drive system.

However, overshooting occurs in the drive shaft torque due to response delay of a feedback system fed back from the rotational speed detecting unit 13 to the deviation computing unit 16. Although it is possible to reduce the overshooting of the drive shaft torque by using a low-pass filter, there has been a problem that rising of the drive shaft torque is delayed.

Thus, the first embodiment reduces the overshooting of the drive shaft torque, and makes rising of the drive shaft torque earlier.

[First Embodiment]

Subsequently, embodiments of the present invention will be described by referring to the drawings. In the following descriptions for the drawings, the same or similar parts are attached with the same or similar reference signs.

Figure 2:
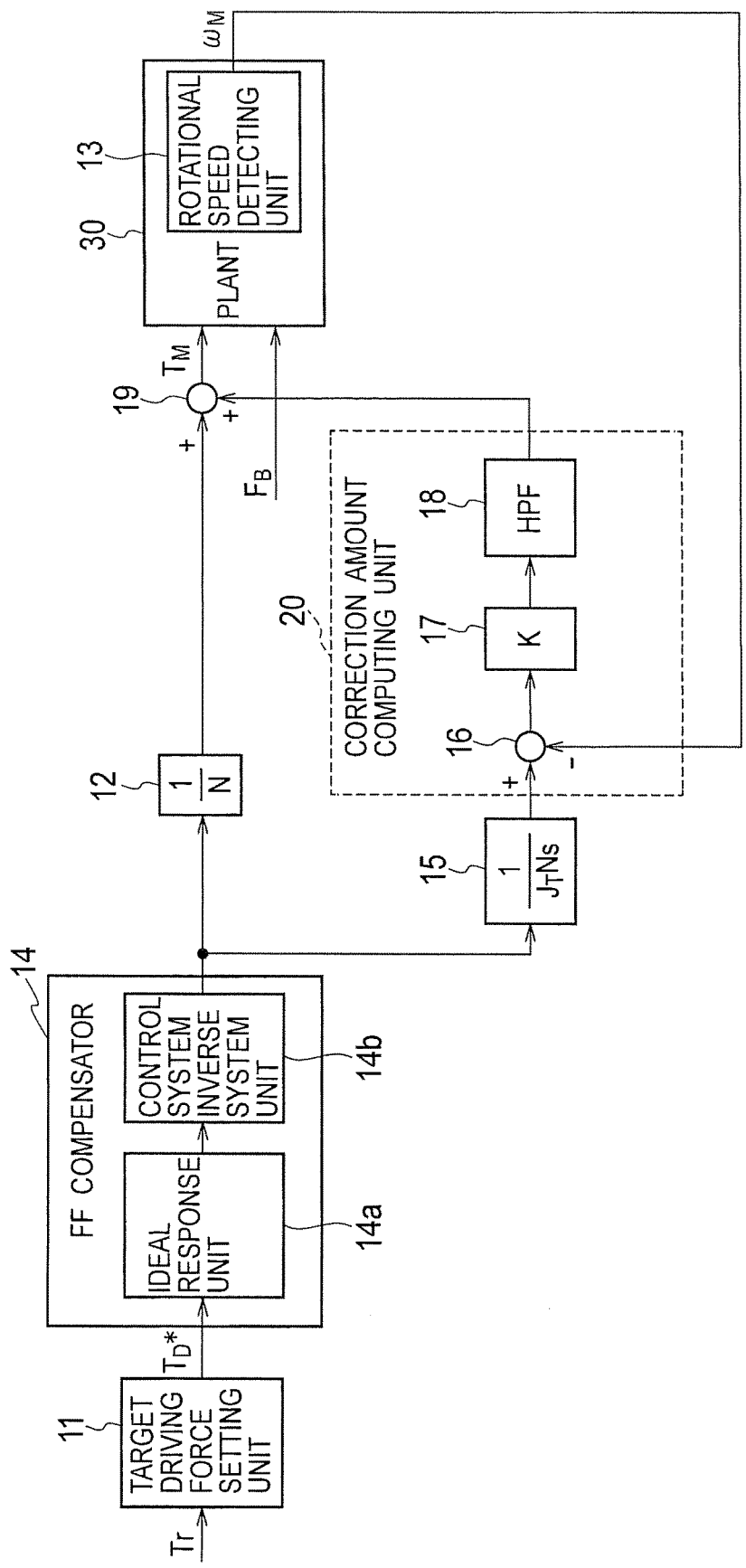
FIG. 2 is a block diagram showing an example of a configuration of the driving force controller for an electric vehicle according to a first embodiment of the present invention.

FIG. 2 shows an example of configuration of the driving force controller for an electric vehicle according to a first embodiment of the present invention. A setting method of an FF compensating unit in the first embodiment of the present invention will be described by using FIG. 3. The first embodiment is characterized by providing a feedforward compensator (hereinafter referred to as an FF compensator 14) in the configuration illustrated in FIG. 1. The FF compensator 14 includes an ideal response unit 14a and a control system inverse system unit 14b.

Figure 3:
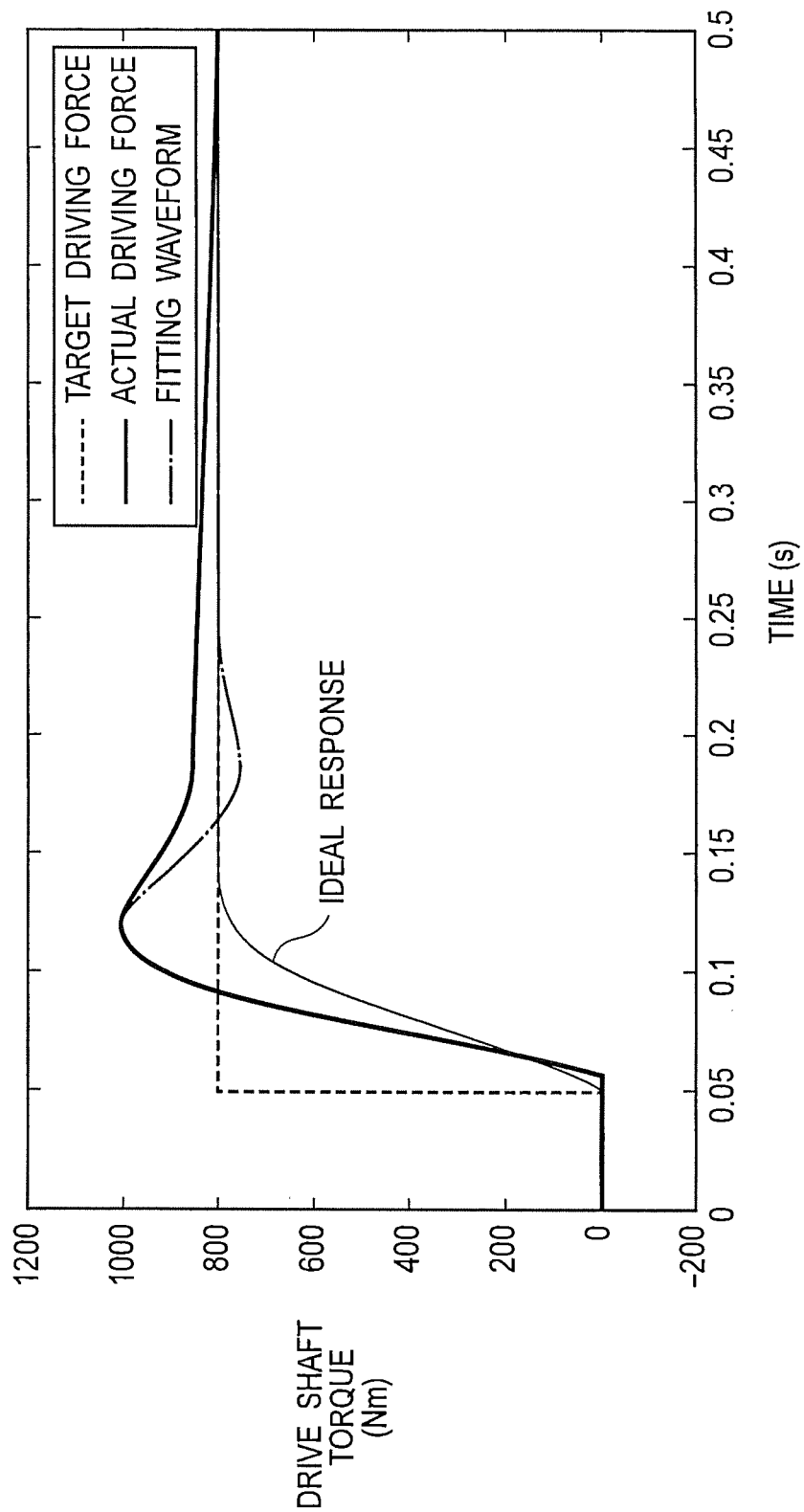
FIG. 3 is a graph explaining a control tuning method of the first embodiment of the present invention.

The ideal response unit 14a sets a first transfer function G1 for causing an actual driving force to become an ideal response that does not overshoot the target driving force set by the target driving force setting unit 11. In FIG. 3, the ideal response is indicated by a thin line.

The control system inverse system unit 14b makes setting as follows. First, in the control system in which the FF compensator 14 is deleted, a response of an actual driving force to a step input of the target driving force is acquired. In FIG. 3, the target driving force of the step input is indicated by a dotted line and the actual driving force is indicated by a solid line.

Then, a transfer function from the target driving force to the actual driving force is acquired with adjustment so as to fit a response waveform, and the fitting waveform obtained by this adjustment is made a second transfer function G2. In FIG. 3, the fitting waveform is indicated by a one-dot chain line. That is, a response of the control system making dynamic correction to the target driving force is approximated by the second transfer function G2.

Finally, an inverse 1/G2 of the second transfer function G2 is acquired and made a control system inverse system unit 14b. That is, the control system inverse system unit 14b is set to be an inverse system of the control system making dynamic correction to the target driving force.

With such a configuration, the target driving force from the target driving force setting unit 11 goes through the FF compensator 14 having G1/G2 as the transfer functions and the control system of the second transfer function G2, and the actual driving force as a response is outputted. That is, by providing the FF compensator 14 having G1/G2 as the transfer functions, it is possible to make a relation between the target driving force and the actual driving force be the first transfer function G1 which is an ideal response characteristic.

Moreover, the response of the control system preferably approximates the transfer function by the secondary delay element. This is because, if the number of dimensions is increased, approximation accuracy is improved, but a computation load of the FF compensator 14 is increased. In the case of approximation by the secondary delay element, an error appears as a difference between the solid line and the one-dot chain line in FIG. 3 after 0.15 to 0.25 seconds.

As the first transfer function G1 and the second transfer function G2, the secondary delay element is used. This secondary delay element can be expressed by the following equation 4:

$$Gh3(s) = \frac{\omega_n^2}{s^2 + 2\zeta\omega_n s + \omega_n^2} \quad \text{[Equation 4]}$$

where $\omega_n$[rad/s] is a characteristic frequency, $\zeta$ is a damping ratio (non-dimensional amount), and s is a Laplace variable in the Laplace conversion.

In the first embodiment, the second transfer function G2 having the secondary delay element obtained by fitting has the characteristic frequency $\omega_n$ of 50 rad/s and the damping ratio $\zeta$ of 0.4. The characteristic frequency $\omega_n$ of the first transfer function G1 which is the ideal response is set to 50 rad/s, which is the same as the characteristic frequency $\omega_n$ of the second transfer function G2.

The damping ratio $\zeta$ of the first transfer function G1 is set larger than the damping ratio $\zeta$ of the second transfer function G2, that is, 0.8, for example. As a result, the overshooting of the actual driving force with respect to the target driving force can be reduced. The larger the damping ratio $\zeta$ is set, the smaller the overshooting can be made, but that delays the response of the actual driving force with respect to the target driving force. Thus, the damping ratio $\zeta$ is set so that the overshooting falls within an allowable range.

FIG. 4(a) shows a simulation result of the target driving force, the actual driving force, and the motor torque when the first transfer function G1 and the second transfer function G2 of a secondary delay element are used in the first embodiment of the present invention. FIG. 4(b) shows a simulation result of the target driving force, the actual driving force, and the motor torque when a low-pass filter is used as a comparative example (when the FF compensator is changed to the low-pass filter). In FIGS. 4(a) and 4(b), a dotted line indicates the target driving force, a solid line indicates the actual driving force, and a one-dot chain line indicates a value obtained by multiplying the motor torque by the speed reduction ratio N.

When the low-pass filter is passed through, a behavior of the motor torque is largely different (FIG. 4(b)). Thus, rising timing of the actual driving force is delayed.

On the other hand, in the first embodiment illustrated in FIG. 4(a), rising of the drive shaft torque can be quickened. As a result, acceleration response to the accelerator operation can be quickened.

That is, even in an environment where load fluctuation of the motor is large and a high response is required to the required driving force of the driver as in the motor in the vehicle drive system, the acceleration response to the accelerator operation can be quickened.

Figure 5:
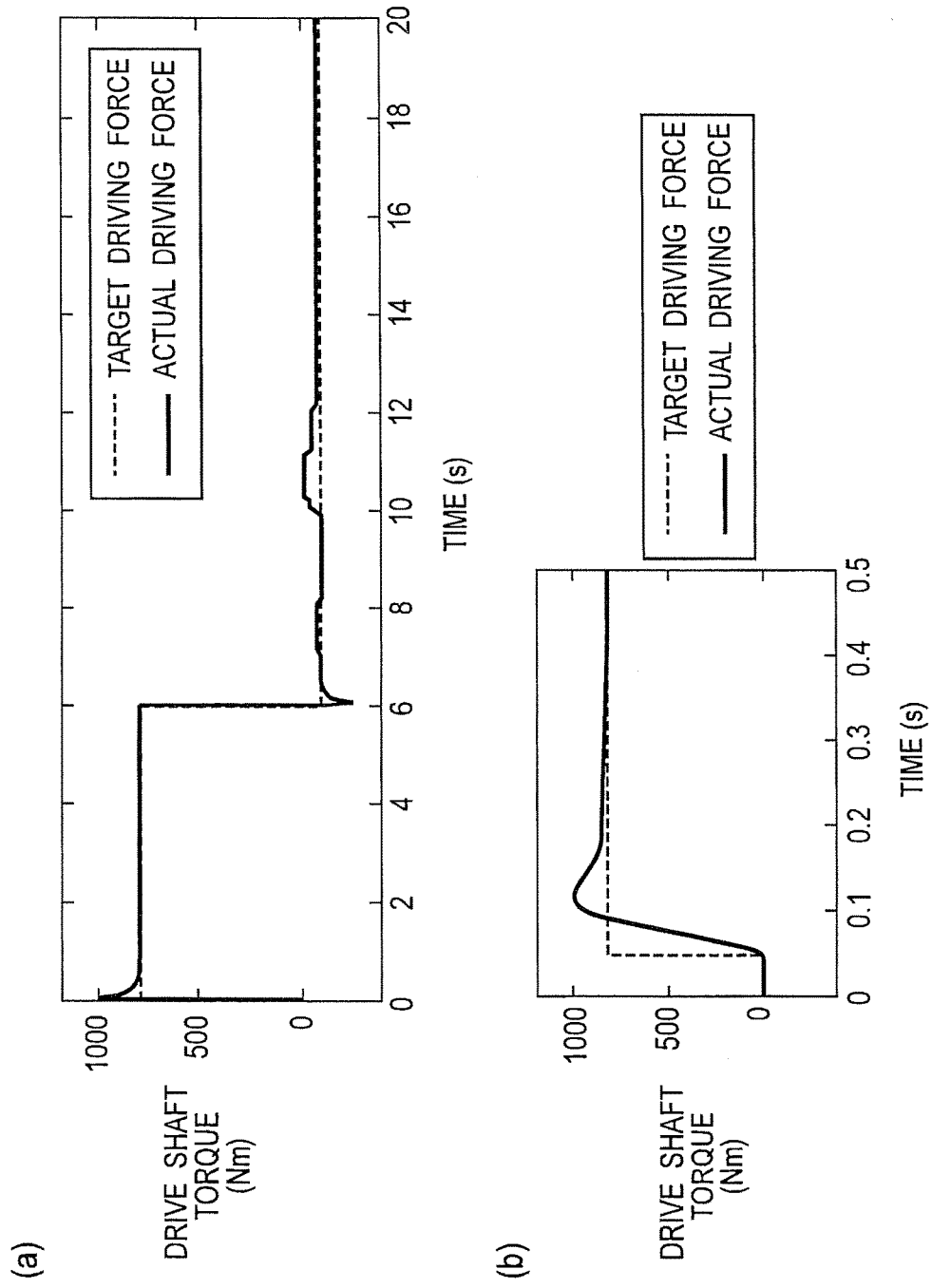
FIG. 5($a$) is a graph showing changes of the target driving force and the actual driving force when an FF compensator is not provided.

FIG. 5(a) shows changes of the target driving force and the actual driving force when the FF compensator is not provided. FIG. 5(b) shows detailed changes at rising of the target driving force and the actual driving force shown in FIG. 5(a). If the FF compensator 14 is not provided, it is known than the overshooting at rising of the drive shaft torque is large as illustrated in FIGS. 5(a) and 5(b).

Figure 6:
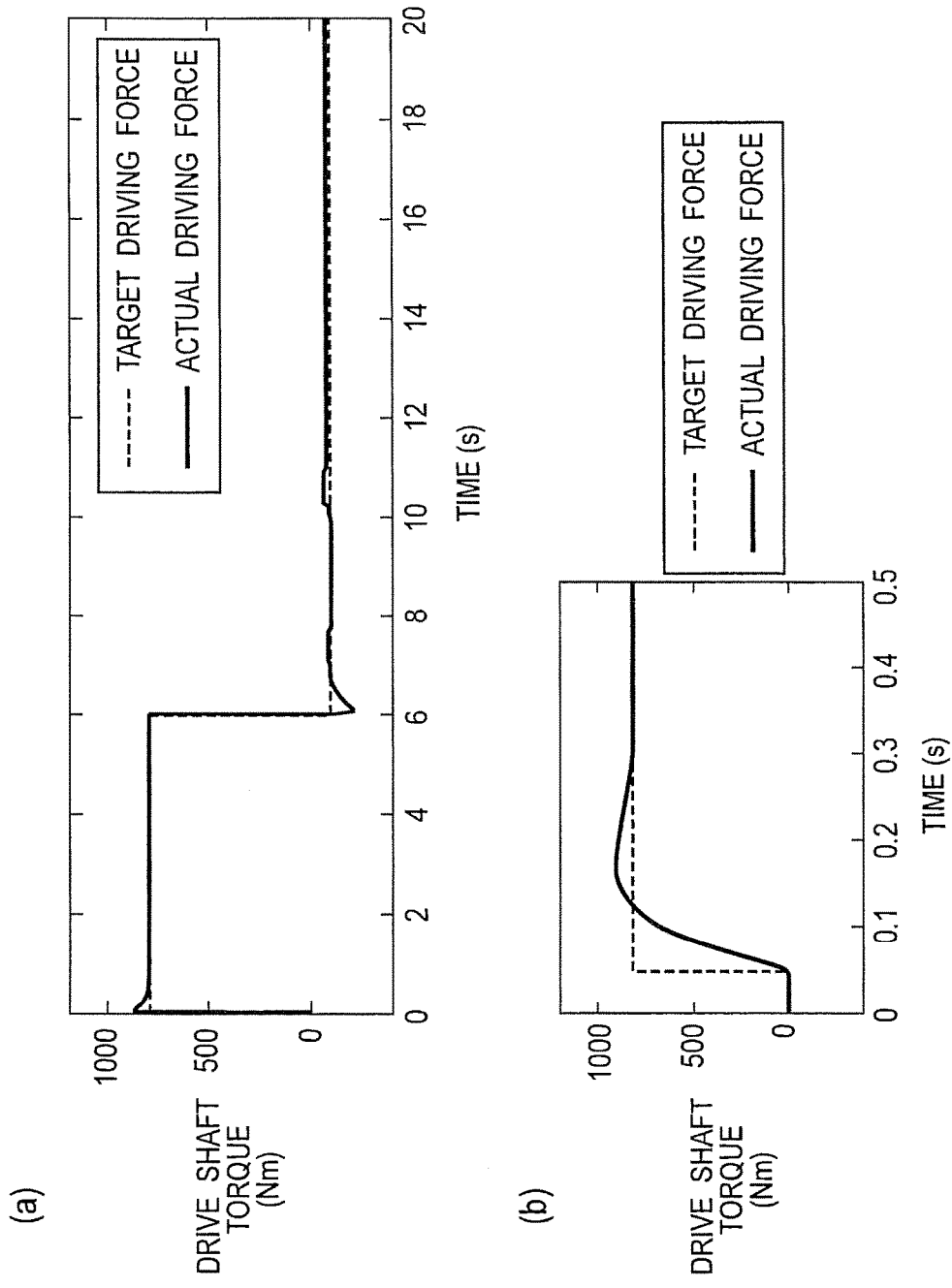
FIG. 6($a$) is a graph showing changes of the target driving force and the actual driving force when the FF compensator in the first embodiment is provided.

FIG. 6(a) shows changes of the target driving force and the actual driving force when the FF compensator in the first embodiment is provided. FIG. 6(b) shows detailed changes at rising of the target driving force and the actual driving force shown in FIG. 6(a). If the FF compensator 14 is provided, as illustrated in FIGS. 6(a) and 6(b), it is known that overshooting at rising of the drive shaft torque is reduced.

Moreover, in the first embodiment, since the respective characteristic frequencies of the first transfer function G1 and the second transfer function G2 are set to the same characteristic frequency, the motor torque requested for vibration suppression can be prevented from increasing to such an excessive value that cannot be realized.

FIG. 7(a) shows a change of the drive shaft torque when the characteristic frequency of the ideal response of the first embodiment is changed from 50 rad/s to 100 rad/s. FIG. 7(b) shows a change of the motor torque×speed reduction ratio when a characteristic frequency of the ideal response of the first embodiment is changed from 50 rad/s to 100 rad/s.

When the characteristic frequency is set to 100 rad/s, the driving force response is quickened. However, the motor torque request transitionally becomes an extremely large value. Actually, such a large torque cannot be realized in many cases. When 50 rad/s is doubled to 100 rad/s, the motor torque of a square times of 50 rad/s, that is, the motor torque of four times is requested transitionally in the case of 100 rad/s (FIG. 7 (b)).

If stepping on the accelerator is suppressed, the target driving force is made small, and the requested motor torque can be realized even at 100 rad/s, but this is limited or not limited by a pressing amount on the accelerator. That is not preferable from the viewpoint of operation maneuverability felt by the driver during driving since a speed of the driving force response is changed.

According to the first embodiment, the motor torque becomes difficult to be limited, and a change of the driving force response speed by the pressing amount on the accelerator is suppressed.

[Second Embodiment]

In the first embodiment, the characteristic frequencies of the first transfer function G1 and the second transfer function G2 are set to the same value, and even if a case where the target driving force is changed in steps is assumed, the motor torque is prevented from becoming excessively large.

However, considering that the target driving force is set in accordance with an accelerator opening degree, instantaneous changes do not have to be assumed, and safety is overestimated more than necessary and the response is delayed accordingly.

Thus, the second embodiment is characterized by reducing a response delay to the operation by making the response faster in accordance with a change speed (acceleration request value of the driver) of the target driving force.

Figure 8:
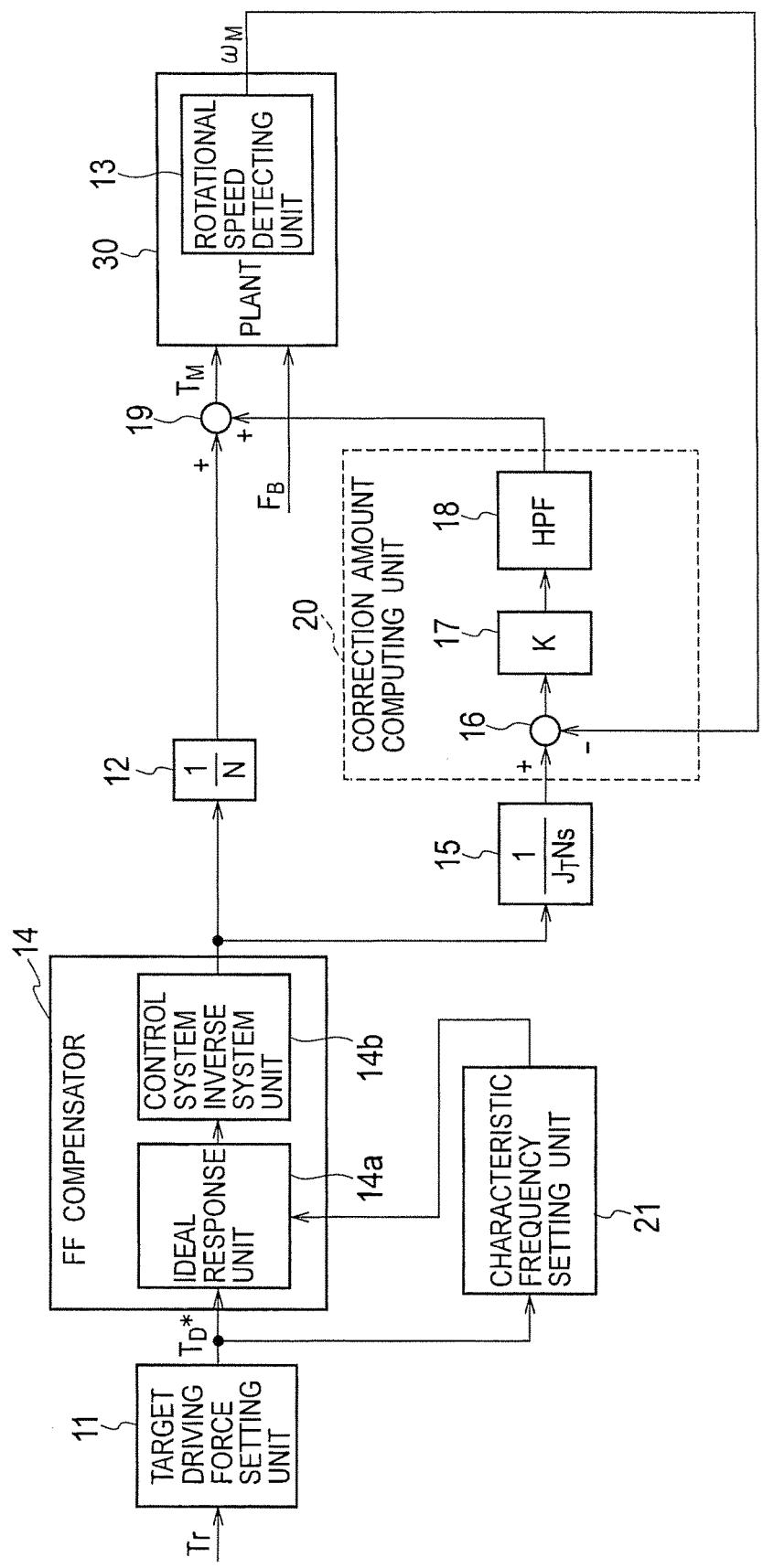
FIG. 8 is a block diagram showing an example of a configuration of a driving force controller for an electric vehicle according to a second embodiment of the present invention.

FIG. 8 is a block diagram showing an example of a configuration of the driving force controller for an electric vehicle according to the second embodiment of the present invention. The second embodiment is characterized by, as compared with the configuration of the first embodiment, further including a characteristic frequency setting unit 21 connected between the target driving force setting unit 11 and the ideal response unit 14a, differentiating the target driving force, setting a differential value of the target driving force to a rising speed of acceleration requested by the driver, and setting such that, the smaller the rising speed of the acceleration requested by the driver, to the larger value the characteristic frequency of the first transfer function G1 is set.

Specific processing of the characteristic frequency setting unit 21 will be described below by referring to FIGS. 9(a) and 9(b). FIG. 9(a) shows a timing chart of each portion for explaining an operation of the characteristic frequency setting unit 21 of the driving force controller for an electric vehicle according to the second embodiment of the present invention. FIG. 9(b) shows a conversion table for acquiring a characteristic frequency of the first transfer function from an average value of a differential value of a driving force request value.

First, when the vehicle speed is 0 km/h and the target driving force is 0 Nm, the characteristic frequency setting unit 21 differentiates the target driving force $T_D^*$, and calculates the differential value of the target driving force $T_D^*$. At this point of time, the differential value of the target driving force $T_D^*$ is smaller than a threshold value Th1 for recognizing acceleration start.

After that, if the accelerator is stepped on and the target driving force $T_D^*$ is increased, the differential value of the target driving force $T_D^*$ becomes a value exceeding the threshold value Th1 for recognizing acceleration start at certain time t1. In order to detect this time t1, the characteristic frequency setting unit 21 calculates the differential value of the target driving force $T_D^*$ at a time interval for sampling at any time and compares the differential value of the target driving force $T_D^*$ calculated each time and the threshold value Th1 for recognizing acceleration start.

The characteristic frequency setting unit 21 starts a timer, not shown, and measures time from start by using the timer at the time t1 when the differential value of the target driving force $T_D^*$ exceeds the threshold value Th1 for recognizing acceleration start.

Subsequently, at time t2 after predetermined time has elapsed since start of the timer, that is, when a timer value of the timer reaches a threshold value Th2 for setting an average value calculation period of the differential value of the target driving force $T_D^*$, the characteristic frequency setting unit 21 acquires an average value P3 of the differential values of the target driving force $T_D^*$ during an average value calculation period DA from the time t1 to the time t2. A value P1 is a differential value of the target driving force $T_D^*$ at the time t1 and a value P2 is a differential value of the target driving force $T_D^*$ at the time t2.

There can be various methods for acquiring the average value P3. For example, the average value P3 may be acquired by averaging the differential value P1 at the time t1 and the differential value P2 at the time t2. Alternatively, the average value P3 may be acquired by dividing an increase amount of the target driving force $T_D^*$ during the average value calculation period DA by a duration (t2−t1).

Note that, as compared with the time interval for sampling for the characteristic frequency setting unit 21 to calculate the differential value of the target driving force $T_D^*$, the duration (t2−t1) of the average value calculation period DA is assumed to be longer.

Subsequently, by referring to a characteristic frequency conversion table shown in FIG. 9(b), the characteristic frequency setting unit 21 sets the characteristic frequency of the first transfer function G1 from the average value P3 of the differential value of the calculated target driving force $T_D^*$. Then, the characteristic frequency setting unit 21 changes the characteristic frequency of the ideal response unit 14a in the FF compensator 14 to the set characteristic frequency. As shown in FIG. 9(a), the characteristic frequency of the first transfer function G1 is raised from 50 rad/s to 100 rad/s, for example, for a period from the time t2 to time t3.

Moreover, at the time t3 when the predetermined time has elapsed and the timer value has reached a threshold value Th3 for certifying acceleration end, the characteristic frequency setting unit 21 returns the characteristic frequency of the first transfer function G1 to the original characteristic frequency, that is, 50 rad/s, for example.

As described above, according to the second embodiment, it is possible to reduce a response delay to the operation by providing the characteristic frequency setting unit 21 and thereby making the response faster in accordance with a change speed of the target driving force.

That is, even in an environment where load fluctuation of the motor is large and a high response is required to the required driving force of the driver as in the motor in the vehicle drive system, a response delay to the operation can be reduced and the acceleration response to the accelerator operation can be quickened.

FIG. 10(a) shows a change of the drive shaft torque when the characteristic frequency of each of the first transfer function G1 and the second transfer function G2 of the first embodiment is set to 50 rad/s. FIG. 10(b) shows a change of the drive shaft torque when a characteristic frequency of each of the first transfer function G1 and the second transfer function G2 of the second embodiment is set to 200 rad/s.

In FIGS. 10(a) and 10(b), a dotted line indicates the target driving force, a solid line indicates the actual driving force, and a one-dot chain line indicates a value obtained by multiplying requested motor torque by the speed reduction ratio.

At rising of the drive shaft torque, the actual driving force indicated by the solid line in FIG. 10(a) rises with a delay of only approximately 0.05 seconds with respect to the target driving force indicated by the dotted line. On the other hand, it is known that the actual driving force indicated by the solid line in FIG. 10(b) rises substantially without a delay with respect to the target driving force indicated by the dotted line. That is, at the rising of the drive shaft torque, since the characteristic frequency is made larger in FIG. 10(b) than that in FIG. 10(a), it is known that an initial response of the actual driving force is faster with respect to the target driving force. Moreover, in FIGS. 10(a) and 10(b), a maximum value of the requested motor torque is substantially the same.

Thus, in the second embodiment, a response of the driving force can be made faster than that in the first embodiment while a level of difficulty to be influenced by saturation of the motor torque equal to that of the first embodiment is maintained.

That is, even in an environment where load fluctuation of the motor is large and a high response is required to the required driving force of the driver as in the motor in the vehicle drive system, a response of the driving force can be quickened.

The embodiments of the present invention have been described above, but each of the described functions can be implemented by one or more processing circuits. The processing circuit includes an electric circuit constituted by a programmed processor, an op-amp, a capacitor, a resistor and the like. Moreover, the processing circuit also includes a device such as an application specific integrated circuit (ASIC) and a circuit constituent element arranged so as to execute the described functions.

Moreover, these embodiments are only simple exemplifications described in order to facilitate understanding of the present invention, and the present invention is not limited to the embodiments. The technical scope of the present invention is not limited to specific technical matters disclosed in the aforementioned embodiments but includes various variations, changes, alternative technologies and the like that can be easily led therefrom.

The present application claims priority based on Japanese patent Application No. 2014-075961 filed on Apr. 2, 2014, the whole contents of which are incorporated herein by reference.

INDUSTRIAL APPLICABILITY

According to the present invention, a driving force controller for an electric vehicle which can reduce overshooting of the actual driving force with respect to the target driving force with a simple configuration, while suppressing the torsional vibration generated in the drive system.

REFERENCE SIGNS LIST 11 target driving force setting unit
12 dividing unit
13 rotational speed detecting unit
14 FF compensator 14a ideal response unit
14b control system inverse system unit
15 target speed computing unit
16 deviation computing unit
17 multiplying unit
18 disturbance removing unit
19 command value computing unit
20 correction amount computing unit
21 characteristic frequency setting unit
30 plant

The invention claimed is:

1. A driving force controller for an electric vehicle, which controls a driving force of a motor in a vehicle drive system, the driving force controller configured to:
   set a driving force requested by a driver as a first target driving force;
   compute a target rotational speed of the motor from an input target driving force by using a vehicle model in which the vehicle drive system is assumed to be a perfect rigid body;
   compute, based on the target rotational speed and an actual rotational speed of the motor, a correction amount for reducing deviation between the target rotational speed and the actual rotational speed;
   compute a motor torque command value by adding the correction amount to the input target driving force, the driving force controller comprising:
   a feed-forward compensator for computing a second target driving force so as to suppress overshooting of an actual driving force that is actually outputted, with respect to the first target driving force, wherein the feed-forward compensator includes:
   a first transfer function expressing a characteristic that the actual driving force becomes a predetermined response with respect to the first target driving force; and
   an inverse of a second transfer function approximately expressing a transmission characteristic between the input target driving force and the actual driving force in a control system including the driving force controller except the feed-forward compensator; and
   the second target driving force is inputted as the input target driving force to the control system.

2. The driving force controller for the electric vehicle according to claim 1, wherein
   the second transfer function approximates the control system by a secondary delay element;
   a damping ratio of the secondary delay element is set to a predetermined damping ratio corresponding to a response of the actual driving force; and
   a characteristic frequency of the secondary delay element is made a predetermined characteristic frequency corresponding to the response of the actual driving force.

3. The driving force controller for the electric vehicle according to claim 2, wherein
   the first transfer function is a secondary delay element, and
   a damping ratio of the first transfer function is larger than the damping ratio of the second transfer function.

4. The driving force controller for the electric vehicle according to claim 3, wherein respective characteristic frequencies of the first transfer function and the second transfer function are the same value.

5. The driving force controller for the electric vehicle according to claim 1, further configured to:
   set the characteristic frequency of the first transfer function to a larger value, as a change speed of an acceleration request value of the driver is smaller.

6. The driving force controller for the electric vehicle according to claim 5,
   further configured to: differentiate the first target driving force and processes a differential value of the first target driving force as the change speed of the acceleration request value of the driver.

* * * * *